(12) United States Patent
Raasch

(10) Patent No.: US 6,497,081 B1
(45) Date of Patent: Dec. 24, 2002

(54) UTILITY POLE ACCESS COVER WITH RATCHETING ATTACHMENT

(76) Inventor: Jason J. Raasch, 2111 N. Burke Dr., Arlington Heights, IL (US) 60004

( * ) Notice: Subject to any disclaimer, the term of this patent is extended or adjusted under 35 U.S.C. 154(b) by 0 days.

(21) Appl. No.: 09/626,575

(22) Filed: Jul. 27, 2000

(51) Int. Cl.$^7$ ................................................ E04C 3/30
(52) U.S. Cl. ........................ 52/736.1; 52/82; 52/198; 52/95; 52/465; 411/344
(58) Field of Search ............................ 52/95, 736.1, 82, 52/198, 220.1, 465, 466, 468, 470, 471; 174/66, 67; 220/3.8, 241; 411/344, 340, 510, 512, 913

(56) References Cited

U.S. PATENT DOCUMENTS

| | | | |
|---|---|---|---|
| 291,771 A | | 1/1884 | Rasgorshek |
| 345,073 A | | 7/1886 | Phillips |
| 1,846,400 A | | 2/1932 | Macfarlane |
| 2,014,444 A | | 9/1935 | Miller |
| 2,179,198 A | | 11/1939 | Reed |
| 2,183,844 A | * | 12/1939 | Murphy ........................ 52/446 |
| 2,422,420 A | | 6/1947 | Judd |
| 3,028,938 A | * | 4/1962 | Schorr ........................ 52/470 |
| 3,320,601 A | | 5/1967 | Yankus |
| 3,342,000 A | * | 9/1967 | Cripe ........................ 52/466 |
| 3,343,322 A | | 9/1967 | Lurkis et al. |
| 3,553,915 A | * | 1/1971 | Passovoy ...................... 52/467 |
| 3,570,205 A | * | 3/1971 | Payne ........................ 52/470 |
| 3,574,985 A | * | 4/1971 | Pierce ........................ 52/463 |
| 3,604,171 A | * | 9/1971 | Perilstein ..................... 52/400 |
| 3,755,977 A | | 9/1973 | Lewis |
| 3,766,698 A | * | 10/1973 | Dallen ........................ 52/400 |
| 4,031,680 A | * | 6/1977 | Stoakes ....................... 52/400 |
| 4,648,231 A | * | 3/1987 | Laroche ....................... 52/775 |
| 4,712,338 A | * | 12/1987 | Trickel .......................... 52/90 |
| 4,914,258 A | | 4/1990 | Jackson |
| 4,959,939 A | * | 10/1990 | Buchanan, Jr. .............. 52/462 |
| 5,087,796 A | * | 2/1992 | Norman ........................ 174/67 |
| 5,120,168 A | | 6/1992 | Padula |
| 5,598,753 A | | 2/1997 | Lee |
| 5,641,939 A | | 6/1997 | Tourigny |
| 5,651,651 A | * | 7/1997 | Spencer ....................... 411/372 |
| 5,678,383 A | * | 10/1997 | Danielewicz ................. 52/775 |
| 5,687,524 A | * | 11/1997 | Ting ............................ 52/461 |
| 5,927,747 A | | 7/1999 | Farrington |
| 5,953,842 A | | 9/1999 | Bodell |
| 6,064,005 A | * | 5/2000 | Raasch ........................ 174/66 |
| 6,102,407 A | * | 8/2000 | Moriya et al. ............... 277/316 |
| 6,105,317 A | * | 8/2000 | Tomiuchi et al. ........... 52/173.3 |

FOREIGN PATENT DOCUMENTS

| | | | | |
|---|---|---|---|---|
| FR | 1522500 | * | 3/1968 | .................. 52/466 |
| FR | 2451485 | * | 11/1980 | .................. 52/467 |
| GB | 556249 | * | 9/1943 | .................. 52/466 |
| IT | 440074 | * | 10/1948 | .................. 52/466 |

* cited by examiner

Primary Examiner—Lanna Mai
Assistant Examiner—Phi Dieu Tran A
(74) Attorney, Agent, or Firm—Greer, Burns & Crain, Ltd.

(57) ABSTRACT

An access cover assembly for use in removably covering an access opening of a utility pole, the access opening defined in part by opposing side edges. The cover assembly includes a cover having peripheral edges configured to engage the pole, a threaded fastener and a gripping apparatus. Two interlocking portions make up the gripping apparatus, a first portion is configured to engage a second portion with at least one of the side edges of the pole sandwiched therebetween. At least one of the first interlocking portion and the second interlocking portion have locking formations for creating the interlocking relationship. Each of the cover and both portions of the gripping apparatus have a throughbore for accommodating the fastener, so that upon assembly of the gripping apparatus in the access opening, as the fastener is rotated axially, the cover is pulled toward the apparatus and simultaneously tightened against the pole, and the first and second interlocking portions are drawn more tightly together.

14 Claims, 5 Drawing Sheets

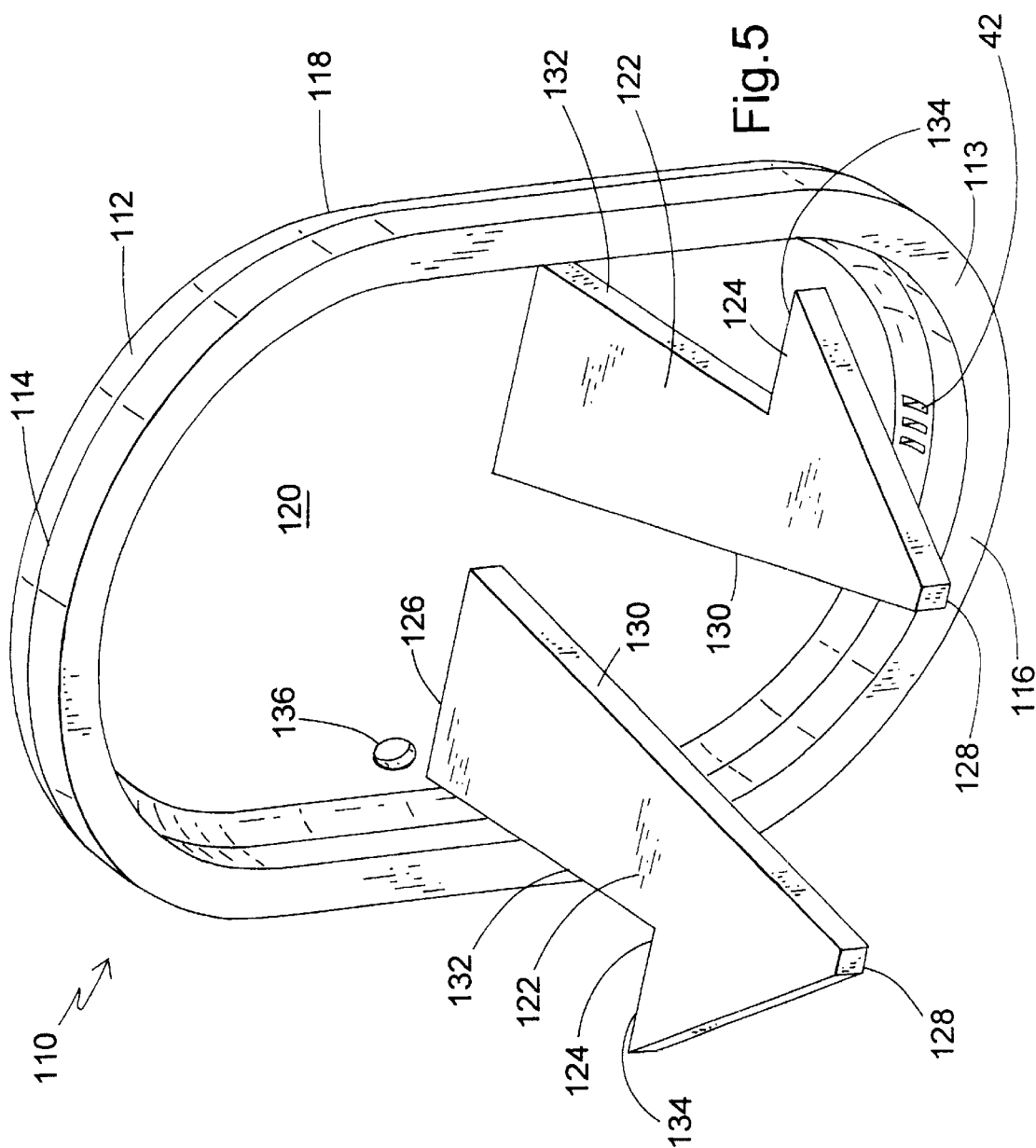

UTILITY POLE ACCESS COVER WITH RATCHETING ATTACHMENT

BACKGROUND OF THE INVENTION

The present invention relates generally to a replacement cover for the access opening typically found near the base of utility poles. Utility poles are generally cylindrical in shape with hollow interiors to allow for storage of electrical wiring. The wiring powers the light fixture located at the top of the pole.

Utility poles typically include an access opening at a base for servicing the electrical wiring. Generally, the access openings are taller than wide, having elliptical, oval or rectangular perimeters. Sometimes the access openings are configured to support a removable cover for the opening. The cover is typically secured to the pole by threaded fasteners.

These access opening covers have become vulnerable to vandalism: the typically aluminum covers can be stolen for their scrap value; and the covers can also be removed in order to steal the electricity passing through the wires or in order to cut the wires.

Utility service personnel must replace the removed covers. It may take a long time to locate a replacement cover, since the access openings come in various sizes, depending on the manufacturer and vintage of the pole. Meanwhile, people in the immediate environment of the pole are subjected to possible injury via contact with the exposed wires in the coverless access opening.

Even without the threat of vandalism, the conventional metallic access opening design has other disadvantages. For instance, the screws securing the cover to the pole become rusted and difficult to remove when the light pole must be serviced. Furthermore, service personnel risk shorting out the wires with the metal hardware used in installing replacement covers.

A still further disadvantage of conventional universal replacement utility pole covers is that they are unable to fit the variety of utility pole access openings. Some of these openings are bordered by deep, cowl-like edges, while others merely have a thickened bead around the opening. Replacement covers which fit the beaded-type openings do not always properly fit on the cowl-like edged openings, and vice versa.

One attempt at providing a universal access opening cover is disclosed in U.S. Pat. No. 4,914,258. In that patent, the replacement assembly includes a cover shell fitting over the opening, a flat steel retaining bar which fits inside the pole, and a threaded fastener which passes through an opening in the shell and is threadably received in the bar. A major disadvantage of this type of replacement kit is that, because of the bar length and poor positioning characteristics, the threaded fastener must be relatively long and includes a relatively long threaded portion. This structure means that the installer, in many applications, will have to laboriously thread a major portion of the fastener into the bar. In commercial embodiments of this device, assembly of the bar requires two additional threaded bolts which have to be laboriously positioned, retained and tightened simultaneously. This is cumbersome (requiring tools and both hands) and is often difficult due to the proximity of the repair site to high speed traffic or inclement weather conditions (rain, ice, etc.).

Another related disadvantage is that the typically metallic bar and metallic fastener risk the chance of creating shorts in the wiring, particularly when the installer first inserts the bar through the access opening and into the interior of the pole, manipulating and positioning the bar amongst old, potentially exposed wiring. Often the wires become bunched or tangled near the access opening, and must be pushed down to receive the bar. Also, as the fastener is tightened, the tip portion may contact the wires, creating another source of short circuit or shock to the installer. Additionally, when the bar is tightened forward into position, it could pinch otherwise insulated wiring and actually create an exposed wire or a short circuit condition.

Still another disadvantage of the replacement cover disclosed in U.S. Pat. No. 4,914,258 is that when the cover or shell is secured to the pole, a waterproof seal is not achieved, and moisture collects inside the pole. Over time, this moisture accelerates the corrosion of the pole, its internal components and more importantly, the mounting bolts.

Another attempt to create an alternative replacement cover was disclosed in U.S. Pat. No. 6,064,005. In that patent an assembly included: a cover having edges configured for engaging the pole, being provided in a sufficient size to cover the opening, and a claw tool having a central portion and a pair of opposing ends, the central portion having a fastener chamber for lockingly engaging a threaded fastener, the fastener chamber constructed and arranged so that the fastener may be pushed axially into the chamber and held there to secure the cover to the pole to cover the opening, and so that the fastener may be removed by unthreading.

In the preferred embodiment of U.S. Pat. No. 6,064,005, the claw tool is provided with a claw formation at each of two opposing ends to engage side edges of the access opening in a secure manner. Each claw formation has a pair of legs, one leg disposed externally of the pole and the other internally within the pole. The rear leg preferably takes the form of a plurality of spaced, angled, flexible flaps.

Experience with the assembly disclosed in U.S. Pat. No. 6,064,005, however, revealed that in certain situations, the claw tool can be dislodged. In particular, impacts to the upper, lower or side edges of the replacement cover, delivered purposefully or inadvertently, may upset the stability of the claw tool and result in its displacement and/or that of the replacement cover. Thus, there is a need for a replacement cover assembly for a utility pole access opening which is better able to resist side impacts.

Accordingly, it is a primary object of the present invention to provide an improved replacement utility pole access opening cover with heightened stability to withstand blows to the side of the pole.

Another object of the present invention is to provide an improved replacement utility pole access opening cover which is made of non-conductive materials to avoid creating shocks or short circuits.

A still further object of the present invention is to provide an improved replacement utility pole access opening cover which can be implemented with minimal disturbance to existing old wiring and without exerting a shearing action from the passing by and torquing of a sharp metal rod.

It is also an object of the present invention to provide an improved replacement utility pole access opening cover which fits into a wide variety of utility pole access openings.

A still further object of the present invention is to provide an improved replacement utility pole access opening cover which is easily installed without the need for tools.

BRIEF SUMMARY OF THE INVENTION

The above-listed objects are met or exceeded by the present access assembly cover for a utility pole. Included in the features of the present invention is a quick connect two-part gripping apparatus including a receiver and an insert. In the preferred embodiment, the receiver has ratchet-type attachments, fits in the access opening and is configured to receive the insert. The insert also has ratchet-type attachments and interlockingly engages the receiver. Thus, the installer merely fits the engaged insert and receiver into the access opening, then squeezes the insert and the receiver together so that the ratchet-type attachments on the receiver and the insert engage each other and the access opening becomes sandwiched therebetween. Then, the installer pushes a fastener through an opening in a cover portion, through an opening in the insert and ultimately into an opening in the receiver. Next, the installer presses the fastener in by hand until the cover seats tightly against the pole. Additional gripping force can be obtained by tightening the fastener with a tool. The fastener may be removed, if necessary, in a conventional manner by unthreading.

In addition, to prevent short circuits and shocks to the installer, the gripping apparatus, and even the fastener, are made of non-conductive plastic material. To increase the applicability of the present invention to a wider range of utility pole sizes, the receiver may be fitted with extending end portions, the end portions constructed and arranged to engage access openings of various sizes. Another feature is that the cover is provided with an air vent for preventing corrosion of the utility pole and/or its internal components. Tamper resistant fasteners having specialized heads may be used to discourage unauthorized removal of the present covers.

More specifically, the present invention provides an access cover assembly for use in removably covering an access opening of a utility pole, the access opening defined in part by opposing side edges. The cover assembly includes a cover having peripheral edges configured to engage the pole, a fastener and a gripping apparatus. Two interlocking portions make up the gripping apparatus, a first portion is configured to engage a second portion with at least one of the side edges of the pole sandwiched therebetween. At least one of the first interlocking portion and the second interlocking portion have locking formations for creating the interlocking relationship. Each of the cover and both portions of the gripping apparatus have a throughbore for accommodating the fastener, so that upon assembly of the gripping apparatus in the access opening, as the fastener is tightened, the cover is pulled toward the apparatus and simultaneously tightened against the pole and the first and second interlocking portions are drawn more tightly together. By tightening the fastener, the cover is pulled toward the second interlocking portion to enhance the gripping force applied to the pole.

In the preferred embodiment, the insert has a center beam from which one or more arms may be attached. The receiver has sockets corresponding to the arms on the insert. Angled teeth are attached to the arms of the insert, which further correspond to angled barb formations in the sockets of the receiver. When assembled, the receiver is disposed internally within the pole and the insert is disposed externally to the pole. The receiver and insert are interlocked by the engagement of their angled locking formations, the pole being sandwiched therebetween.

In an alternate embodiment, the cover itself has arms attached to a rear face. The arms are preferably proportioned to the length of the sides of the access opening. Attached to the arms are locking formations disposed to face the sides of the access opening. When assembled, the arms and their locking formations tightly and frictionally engage the sides of the access opening and adjacent inner surfaces of the pole, and the cover engages the outer surface of the pole. In this way, the cover is stabilized in the access opening.

BRIEF DESCRIPTION OF THE SEVERAL VIEWS OF THE DRAWINGS

FIG. 5 is a perspective elevational view of an alternate embodiment of the present utility pole access cover.

DETAILED DESCRIPTION OF THE INVENTION

Figure 1:
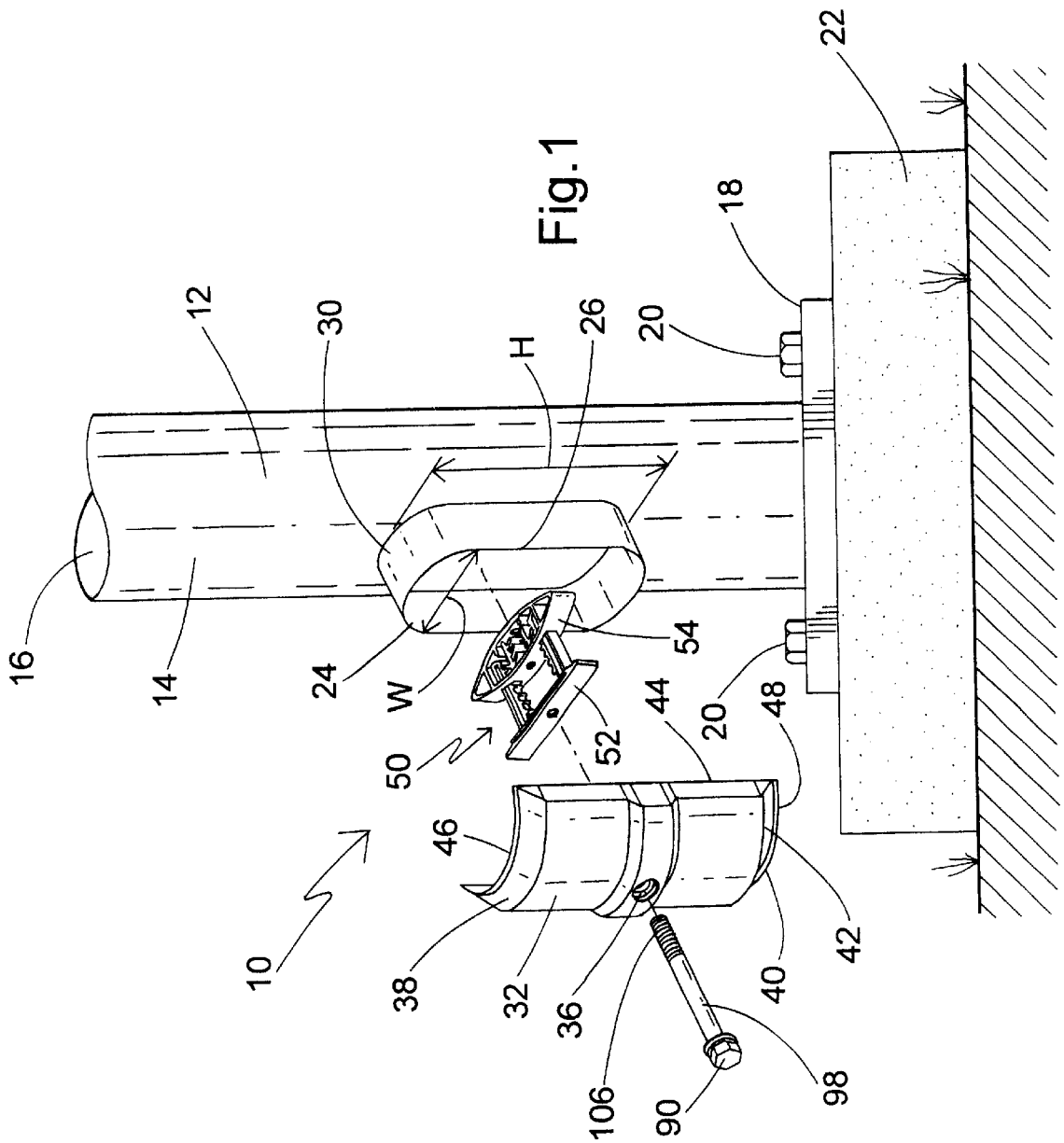
FIG. 1 is a fragmentary exploded perspective elevational view of the present access cover assembly shown on a utility pole.
Figure 2:
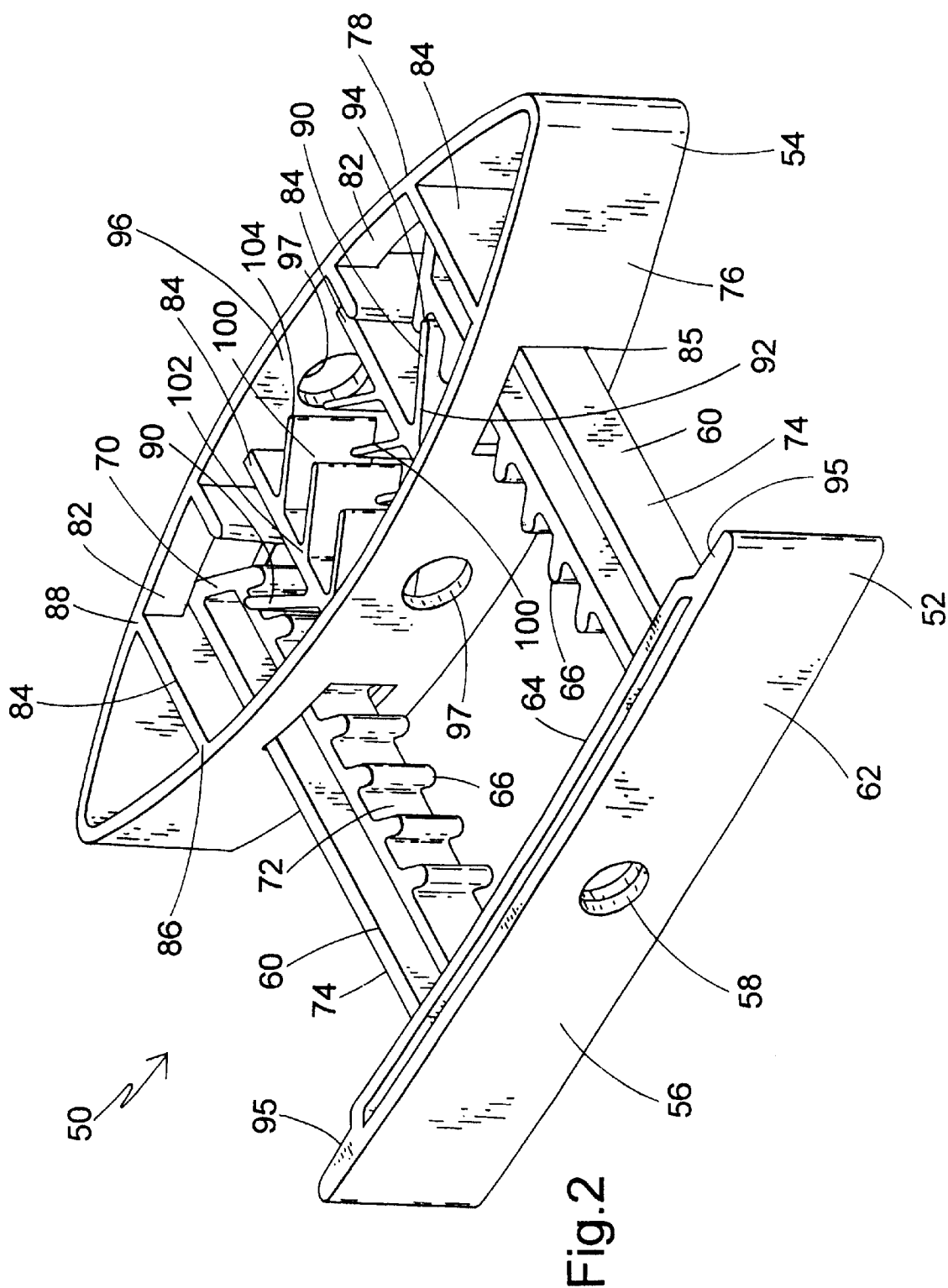
FIG. 2 is a perspective elevational view of the present gripping assembly, shown in the open position

Referring now to FIGS. 1 and 2, the present rapid attachment cover for a utility pole access opening is depicted as an assembly which is generally designated 10. The present assembly 10 is designed for use as a replacement cover for a utility pole 12. Typically used for street lights, traffic signals and the like, the utility pole 12 is generally tubular and hollow, has an outer surface 14 and an inner surface 16. The pole 12 is preferably made of aluminum, however other metals, alloys and even concrete are contemplated. A base 18 of the pole is radially flanged to accommodate fasteners 20 such as bolts to secure the pole 12 to a concrete foundation 22.

An access opening 24 is located near the base of the pole and has a width W, a height H which is taller or longer than the width W, and a pair of side edges 26. In most cases, the overall shape of the opening 24 is oval or ellipsoid, but other shapes, including rectangular, are contemplated. In many cases, the access opening 24 is configured so that the side edges, as well as the entire periphery, are thickened in a radial direction from the center of the pole to accommodate an access cover and to reinforce the strength of the pole in this area. In some cases, the thickening takes the form of a radially extending peripheral flange, and in other cases, the thickening takes the form of a bead or rib. Other configurations of access openings are depicted in U.S. Pat. No. 6,064,005, which is incorporated by reference.

Figure 4:
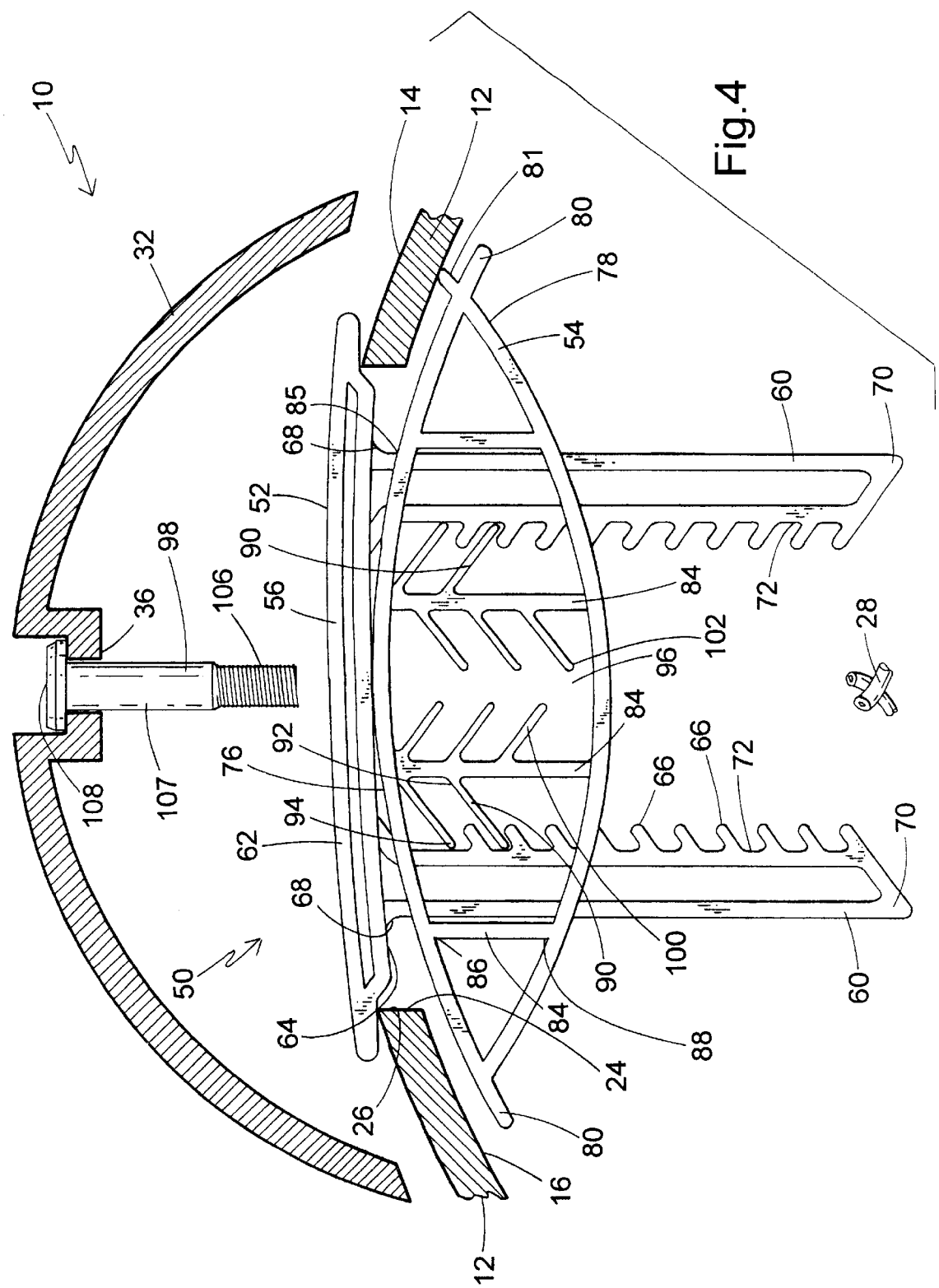
FIG. 4 is an overhead plan view of the gripping assembly of FIG. 3 shown mounted to a utility pole access opening, with the cover shown exploded and in section.

As described in the background above, the original equipment access covers of such poles, typically made of aluminum, are often stolen for scrap value or to obtain access to power wires 28 which run inside the pole 12 (best seen in FIG. 4). The present access cover assembly 10 is intended for use with the pole 12 which is provided with the access opening periphery having a thickness which is greater than that of the surrounding material of the pole, and preferably is significantly thickened to form a peripheral flange 30.

Referring now to FIGS. 1–4, the present access cover assembly 10 includes a cover 32 dimensioned to be larger in peripheral dimension than the access opening 24, as well as similar openings on differing models of utility poles made by a variety of manufacturers. The cover 32, or at least the outer periphery of the cover, is generally curved about its longitudinal axis to fit snugly against the outer surface 14 of the pole 12. In the preferred embodiment, a central throughbore 36 is countersunk in a front face of the cover 32. Respective upper and lower ends 38, 40 of the cover 32 are tapered for many reasons, including weather resistance, aesthetics and conservation of material. The cover 32 is made of rigid, weather-resistant plastic material such as ABS, polyethylene or equivalent engineered materials.

To prevent moisture from accumulating within the pole 12, the cover 32 may feature at least one air vent 42. In the preferred embodiment, a single vent 42 is located at the lower end 40 of the cover 32 to prevent the entry of rain and snow. However the number, shape and position of the vent 42 may vary depending on the application. Also included on the cover is a pair of longitudinal edges 44, an upper edge 46 and a lower edge 48, all of which are configured to snugly and uniformly engage the outer surface 14 of the pole 12.

Another component of the assembly 10, a gripping apparatus, generally designated 50, is preferably made of rigid, durable, non-conductive plastic material such as ABS, polyethylene or equivalent engineered material. It is preferred that the gripping apparatus 50 be injection molded, however other equivalent manufacturing techniques may be utilized as are known by skilled practitioners in the art. The gripping apparatus 50 has two interengageable portions: a first portion generally referred to as an insert 52, and a second portion generally referred to as a receiver 54.

The insert 52 includes a center beam 56 with a throughbore 58 and one or more arms 60. It is important that the length of the arm(s) 60 be at least as long as the thickness of the side edges 26. Defined by a front face 62 and a rear face 64 which faces the access opening 24, the length of the center beam 56 must be at least as wide as the width W of the access opening 24. When disposed horizontally relative to the access opening 24, the center beam 56 must span the opening 24, and engage both of the side edges 26.

Projecting from the rear face 64, the arms 60 of the insert 52 include two or more locking formations in the form of angled teeth 66. A first end 68 (best seen in FIG. 4) of each of the angled teeth 66 is integrally joined to the arm 60, and a second or free end 70 projects outwardly from the center beam 56 and forms a point or wedge. It is preferred that the angled teeth 66 be inclined towards the rear face 64. In the preferred embodiment, the angled teeth 66 are located on only an interior side 72 of each of the arms 60. But, alternatively, they might also be located on an exterior side 74. In the preferred embodiment placing the teeth 66 on the interior side 72 avoids the possible problem of having the teeth 66 catch onto the side edge 26.

As illustrated in FIGS. 1–4, the receiver 54 preferably has a generally ellipsoid shape defined by a front wall 76 curving in opposition to a rear wall 78. To provide a tight fit betwen the gripping apparatus 50 and the pole 12, the front wall 76 should preferably be curved and dimensioned to engage the inner surface 16 of the pole 12 at least one point. To make the gripping apparatus 50 capable of fitting in a wide variety of access openings, it is also contemplated that the front wall 76 may include at least one extended end portion 80 (best seen in FIG. 4) projecting beyond the intersection of the front wall 76 and the rear wall 78. To properly engage the inner surface 16 of a wide variety of configurations of the pole 12 and/or the access opening 24, the end portion 80 is preferably configured to be sufficiently long for engaging a larger range and variety of shapes of access openings 24. If desired, the end portion 80 may also be fitted with at least one protrusion 81 for forming a stronger engagement with the interior surface 16. While a preferred configuration for the receiver 54 has been illustrated and described, it is contemplated that the receiver may be provided in a variety of configurations, as long as there are formations for engaging the inside surface 16 of the pole adjacent the access opening 24.

To interlockingly engage the arms 60 on the insert 52, the receiver 54 includes at least one socket 82. Preferably, there should be as many sockets 82 as there are arms 60. The socket 82 is defined by the front and rear walls 76, 78 of the receiver 54 along with at least one interior divider or support wall 84. Access to the socket is provided by an inlet 85. A first end 86 of the interior divider 84 is attached to the front wall 76 while a second end 88 is attached to the rear wall 78. Within the socket 82 are situated at least one angled barb formation 90. Each barb formation 90 has a first end 92 attached to one of the interior dividers 84, and a second end 94 projecting into the socket 82.

As one of the arms 60 on the insert 52 is slid into its corresponding socket 82 through the inlet 85, the angled teeth 66 on the arm 60 engage with the angled barb formations 90 in the socket 82, thereby creating a ratcheting, interlocking relationship between the insert 52 and the receiver 54. Preferably, the barb formations 90 are inclined in the opposite direction from the angled teeth 66 for a more secure engagement. It is contemplated that the engagement of the insert 52 and the receiver 54 may be reversed, such that the insert has the barb formations and the receiver has the teeth.

To make the gripping apparatus 50 compatible with a wide range of utility pole access opening configurations, the center beam 56 of the insert 52 has at least one shoulder formation 95 located on the rear face 64 outboard of the adjacent arm 60. The shoulder formations 95 create a locating spot on the insert 52 which is configured to engage and locate onto the side edge 26. The shoulder 95 also extends laterally to receive side edges 26 having a range of widths. Although only one shoulder formation 95 is depicted, it will be appreciated that the number, spacing and configuration of the shoulder formations may vary with the application.

Another important feature of the receiver 54 is that it contains an interior cell 96 constructed and arranged so that a fastener 98 may be readily pushed axially into the cell by the installer so that the fastener will be securely retained, thus securing the cover 32 to the pole 12 to cover the opening 24, and so that the fastener can be removed by unthreading if desired. More specifically, the interior cell 96 is defined by the front and rear walls 76, 78 along with the interior dividers 84 and a throughbore 97. Preferably, the interior cell 96 shares the interior dividers 84 with the barb formations 90, but the interior cell 96 can also be defined by its own set of interior dividers.

At least one barb 100 is angled obliquely to a longitudinal axis of the cell 96, which is the same as the axial orientation of the fastener 98 once it is inserted into the cell. In the preferred embodiment, the interior cell 96 is generally centrally located in the receiver 54, and there are two rows of barbs 100, each oriented at an oblique, approximately 45° angle to the fastener to engage opposite sides of the fastener 98. It is contemplated that the number, shape and orientation of the barbs 100 may be varied to suit the application, and the present invention is not restricted to the specific orientation disclosed here. Each barb 100 has a first end 102 secured to the interior divider 84, and a second end 104 which projects freely into the interior cell 96 to engage threads 106 on the fastener 98.

While the fastener 98 is depicted as a conventional threaded bolt or screw, it is also contemplated that fasteners having a bayonet or push-and-twist, or a cammed engagement may be considered to be within the scope of the invention. Also, it is contemplated that the fasteners may be provided with at least one strengthening rib 107 extending from a head of the fastener to the threads 106. It has been found that the fastener 98 is sometimes the failure point of such attachments, and enables the unauthorized removal of the cover 32. The rib 107, which increases the stability of the fastener 98 and reduces shear, should be configured and dimensioned so that the axial rotation of the fastener 98 in the gripping apparatus 50 is not impeded.

In operation, and referring to FIGS. 1 and 2, to install the replacement cover 10, the gripping apparatus 50 is oriented so that the insert is engaged with the receiver 54 so that the center beam 56 is separated from the front wall 76 a significant distance. Holding the apparatus 50 in one hand, the installer first places the gripping apparatus in the access opening 24 so that the receiver 54 engages the inner surface of the pole 16. It is recommended that the installer hold the gripping apparatus 50 so that the receiver 54 is gripped in one hand by the fingers, and the insert 52 is held by the thumb. The apparatus 50 is inserted into the opening 24 parallel to the side edges 26, and then rotated 90°. In this position, the side edges 26 are sandwiched between the insert 52 and the receiver 54.

Figure 3:
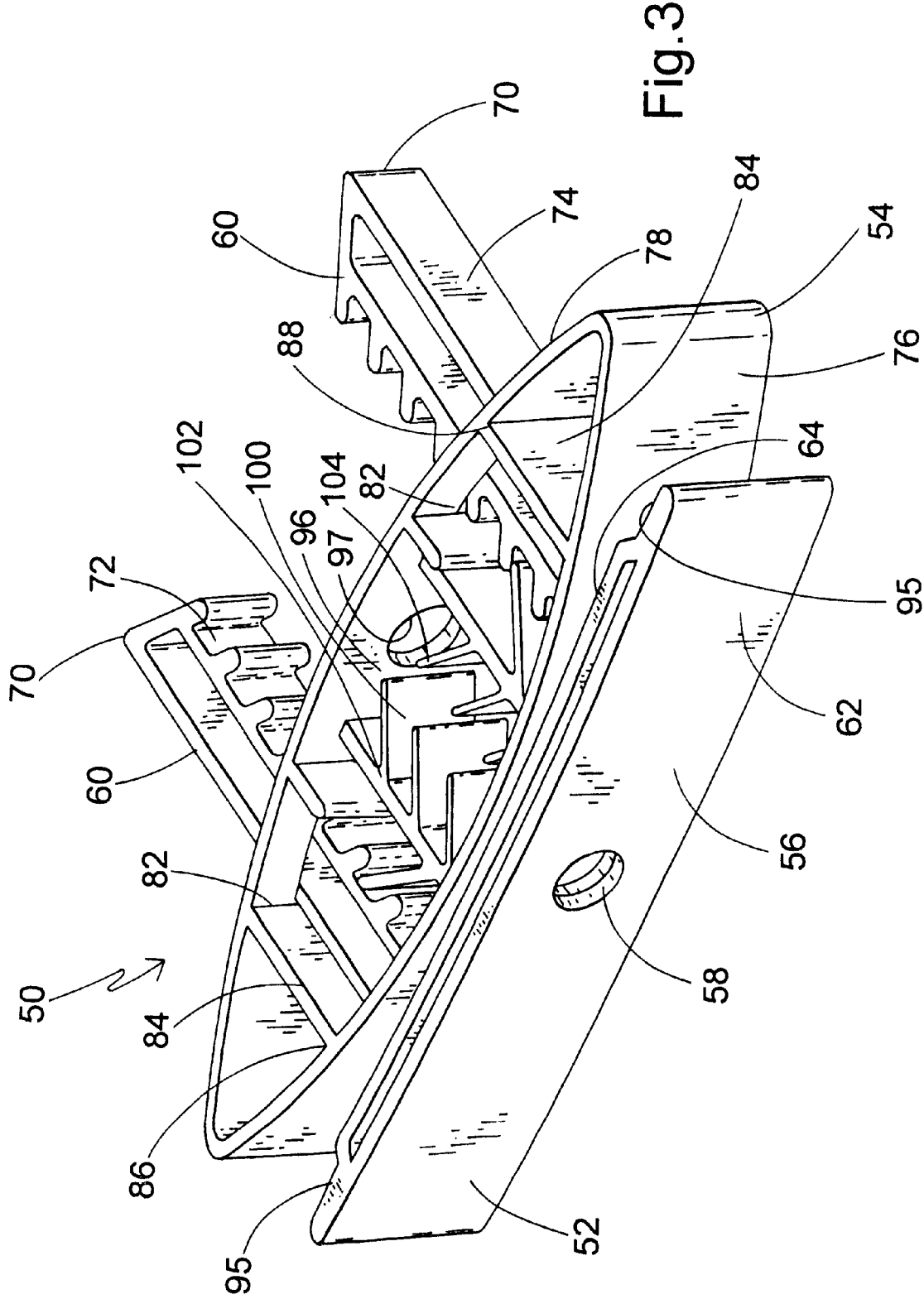
FIG. 3 is a perspective elevational view of the present gripping assembly, show in the closed position

Then, and referring to FIGS. 3 and 4, the installer brings fingers and thumb together, squeezing the insert 52 and the receiver 54 together, causing a ratcheting action between the teeth 66 and the barb formations 90. As the arms 60 of the insert 52 are progressively slid deeper into the sockets 82 on the receiver 54, the rear face 64 of the center beam 56 eventually engages the outer surface 14 of the pole. The apparatus 50 is squeezed sufficiently tight so that the angled teeth 66 engage the angled barb formations 90 in a racheting relationship to tightly secure the apparatus together with the side edges 26 sandwiched therebetween. In this manner, the gripping apparatus 50 is preferably secured midway between upper and lower ends of the opening 24.

Next, the fastener 98 is inserted through the throughbore 36, and the cover 32 and the fastener are placed in operational relationship to the gripping apparatus 50 so that the fastener may be inserted through the throughbores 58, 97 of the insert 52 and the interior cell 96 of the receiver 54. Once the fastener 98 is so inserted, the installer merely presses against the fastener and the cover 32 until the cover abuts the outer surface 14 of the pole 12. At the same time, threads 106 of the fastener 98 are engaged by the free ends 102 of the angled barbs 100. This engagement positively secures the fastener 98 in the gripping apparatus 50 and assembly may be accomplished without the use of any tools. To enhance the gripping action of the cover 32 against the pole 12, the installer may elect to employ a fastening tool such as a screwdriver or wrench to tighten the fastener 98 in the gripping apparatus. This tightening action will, in some cases, cause the interlocking teeth 66 and formations 90 to axially advance an additional tooth or formation relative to each other, to further tighten the insert 52 relative to the receiver 54 and thus more securely fasten the gripping apparatus 50 upon the pole 12. The fastener 98 can only be removed by unthreading. In addition, the gripping apparatus 50 offers the advantage of being adaptable to a wider range of sizes and configurations of access apertures 24.

An advantage of making the gripping apparatus 50 out of non-conductive plastic relates to the fact that during installation, the installer often must push stray wires out of the way in the interior of the pole 12 to accommodate the claw tool. Since it is non-conductive, the gripping apparatus 50 may be used to push the wires away without subjecting the installer to shock injury. The installer merely grasps one end of the apparatus 50 and pushes against the wires with the opposite end. A related advantage relates to the feature of providing the fastener 98 in a non-conductive plastic material such as ABS, so that there will be no corrosion of the fastener which may impede its removal when necessary. However, it will be appreciated that with the cover 32 and the gripping apparatus made from plastic, the chances of corrosion interfering with even a metallic fastener are significantly reduced from the replacement covers of the prior art. Perhaps a greater advantage of non-conductive fasteners is that, upon installation, a tip of the fastener 98 will not cause a short circuit with any wires in the pole 12. Another advantage of the fastener 98 is that a head 108, located opposite the tip, although shown with a hex head in FIG. 1, may be provided with a keyed or otherwise unconventionally shaped head (best seen in FIG. 4) to prevent the unauthorized removal of the cover 32 unless the removing party has the proper tool.

It will be seen that the present gripping apparatus 50 as used in the assembly 10 provides a replacement utility poll access cover which is easily installed, in most cases without the use of tools. If tools are employed, they more securely tighten the interlocking engagement of the apparatus 50 upon the pole, which further secures the cover 32 against vandalism. In addition, the apparatus 50 is useful on a variety of utility pole access opening configurations, and features increased stability to side impact, through the tight engagement between the receiver 54 and the inner surface 16 of the utility pole 12.

Referring now to FIG. 5, an alternate embodiment of the present access cover assembly 10 is depicted and generally designated 110. Components of the alternative access cover assembly 110 which are identical to those of the assembly 10 are designated with identical reference numbers.

The cover assembly 110 includes a cover with a body 112 which is generally planar, but is bendable about its longitudinal axis to flex to be inserted within the access opening 24. A peripheral edge 113 is configured to fit snugly against the outer surface 14 of the pole 12. Dimensioned to be larger in peripheral dimension than the access opening 24, as well as similar openings on differing models of utility poles made by a variety of manufacturers, the cover body 112 is made of rigid, weather-resistant plastic material such as ABS, polyethylene or equivalent engineered materials. Respective upper and lower ends 114, 116 of the cover body 112 are tapered for many reasons, including weather resistance, aesthetics and conservation of material. To prevent moisture from accumulating within the pole 12, the cover body 112 is preferably provided with at least one air vent 42.

Defined by a front face 118 and a rear face 120 which faces the access opening 24, the cover body 112 has two or more arms 122 projecting generally normally from the rear face 120. In this embodiment there are two arms 122, but it is also contemplated that additional arms may be provided to suit particular applications. It is important that the length of the arms 122 be at least as long as the thickness of the side edges 26 and preferably dimensioned to engage the side edge with a snug fit. Again, to provide a tight engagement between the arms 122 and the pole 12, the arms should be disposed on the rear face 120 to correspond to the location of the side edges 26.

Each arm 122 has one or more locking formations 124 projecting therefrom. A first or joined end 126 of the arm 122 is integrally joined to rear face 120, and a second end 128 projects outwardly from the arm 122. In the preferred embodiment, the second end 128 is generally pointed or wedge-shaped. Further, the arm 122 itself is preferably tapered from the first end 126 to the second end 128 on a generally horizontal plane defined by the arm. As illustrated in FIG. 5, the arms have an interior side edge 130 and an exterior side edge 132, and the locking formations 124 are preferably located on an exterior side 132 of the arm 122. This disposition will allow for the locking formations 124 to engage the inner surface 16 of the pole 12. Other shapes and configurations for the arms 122 are contemplated, as long as the arms have a formation for frictionally and securely engaging the side edges 26.

The locking formations 124 are generally notches formed in the exterior side edge 132, and generally form a right angle. A gripping edge 134 of the formation 124 is constructed and arranged on the arm 122 to engage the inner surface 16 of the pole 12. The outer side edge 132 is constructed and arranged to engage the corresponding side edge 26 of the access opening 24.

In operation, to install the replacement cover assembly 110, the installer may "walk" the assembly onto the pole 12 by first inserting one arm 122 into the access opening 24. Next, the installer engages the locking formation 124 so that the gripping edge 134 engages the inner surface 16 of the pole 12. At the same time, the arm 122 is engaged to the side edge 26 on the outer side edge 132. Then, the installer flexes the cover body 112 so that it bows somewhat, and allows the second arm 122 to be inserted into the access opening 24 for engagement as described above for the first arm. Once the installer releases the cover body 112, the inherent memory of the material releases the flex and creates an inherent lateral biasing force to be exerted by the arms against the adjacent side edge 26 of the access opening 24.

Alternatively, the installer may force or jam the assembly 110 upon the pole 12 by aligning the assembly 110 in front of the access opening 24 so that the arms 122 are inside the side edges 26. With a single hard blow, the assembly 110 is pushed into the pole 12 so that the gripping edges 134 tightly engage the pole. In addition to the spring force provided by the flexibility of the cover body 112, there is also a laterally-outwardly directed gripping force exerted by the arms 122. The preferably tapered configuration of the arms 122 facilitates this gripping action, which is relieved at the relatively narrowed end 128 as the angled teeth 124 engage the interior surface 16 of the pole 12 in a hook-like manner.

Thus, it will be seen that the cover assembly 110 is installed without the use of fasteners, tools or even a gripping formation. If it is required to remove the cover body 112, an access opening 136 is provided through which a screwdriver or similar tool is inserted to disengage the locking formation 124 from the side edge 26.

While a particular embodiment of the present access cover assembly for utility poles has been shown and described, it will be appreciated by those skilled in the art that changes and modifications may be made thereto without departing from the invention in its broader aspects and as set forth in the following claims.

What is claimed is:

1. An access cover assembly for use in removably covering an access opening of a utility pole, the access opening defined in part by opposing side edges, said cover assembly comprising:
    a cover having peripheral edges configured to engage the pole;
    a fastener;
    a gripping apparatus including two interlocking portions, a first portion configured to engage a second portion with at least one of the side edges of the pole sandwiched therebetween;
    at least one of said first interlocking portion and said second interlocking portion having locking formations for creating said interlocking relationship;
    said cover and both portions of said gripping apparatus each having a throughbore for accommodating said fastener, so that upon assembly of said gripping apparatus in the access opening, as said fastener is tightened, said cover is pulled toward said apparatus and simultaneously tightened against the pole, and said first and second interlocking portions are drawn more tightly together.

2. The assembly as defined in claim 1 wherein both said portions have formations for creating said interlocking relationship.

3. The assembly as defined in claim 1 wherein each of said first and second interlocking portions have angled rachet formations for creating said interlocking relationship.

4. The assembly as defined in claim 1 wherein said first portion is an insert with at least one arm projecting therefrom, said arm having two or more angled teeth constructed and arranged for engaging said second portion.

5. The assembly as defined in claim 4 wherein said second portion is a receiver, with at least one angled barb formation constructed and arranged for engaging said angled teeth on said first portion.

6. The receiver as defined in claim 5 further including at least one socket for receiving a corresponding one of said arms.

7. The receiver as defined in claim 6 wherein said barb formations are operationally constructed and disposed in said socket for engaging said barb formations of said arm on said first portion as said arm is inserted into said socket.

8. The receiver as defined in claim 5 wherein said receiver has a front wall curved to engage the side edge of the pole.

9. The receiver as defined in claim 8 wherein said receiver also has a rear wall curved in opposition to said front wall to define an ellipsoid shape, and said front wall may have at least one extended end portion defining an arm segment extending past an intersection point of front and rear walls.

10. The assembly as defined in claim 1 wherein said gripping apparatus is configured so that a gripping force is applied when said first and second portions are coplanar.

11. The insert as defined in claim 4 wherein said insert includes a center beam having a rear face from which said at least one arm is attached.

12. The insert as defined in claim 11 wherein said rear face further includes at least one shoulder configured for receiving one of the corresponding side edges of the pole.

13. The assembly as defined in claim 1 wherein said second portion has angled barbs for receiving said threaded fastener, said barbs may also be obliquely angled to said axis of said fastener, and said fastener is threaded and is provided with at least one strengthening rib.

14. A gripping apparatus for use with a cover and a fastener, in removably covering an access opening of a utility pole, the access opening defined in part by opposing side edges, said gripping apparatus comprising:
    an insert having a center beam with a rear face, at least one arm projecting from said rear face, said at least one arm having two or more angled teeth, said rear face further including at least one shoulder configured for receiving one of the corresponding side edges of the pole, said center beam having a throughbore for receiving the fastener;

a receiver configured to engage said insert with at least one of the side edges of the pole sandwiched therebetween, said receiver having at least one socket for receiving a corresponding of said at least one arm, said at least one socket having at least one angled barb formation constructed and disposed therein for engaging said two or more angled teeth on said insert arm such that a squeezing together in a forward axial direction by an installer of said insert and said receiver causes at least one of said two or more arm teeth to engage said at least one barb formation as said at least one arm is received in said corresponding socket to create a ratcheting relationship between said insert and said receiver that enables forward axial motion between said insert and said receiver and restrains said insert and said receiver from retreating from their current forward position and separating axially, said two or more teeth and said at least one angled barb formation angled and shaped to facilitate forward axial motion and resist backward axial motion when engaged with one another, said receiver further including a throughbore and an interior cell for receiving the fastener inserted through said insert center beam, said interior cell constructed and arranged to include at least one barb formation angled obliquely to a longitudinal axis of said interior cell so that the fastener may be pushed through said insert throughbore and axially into said interior cell and held there to secure the cover to the pole to cover the opening and so that the fastener may be removed by unthreading, so that upon assembly of said gripping apparatus in the access opening, as the fastener is tightened, the cover is pulled toward said apparatus and simultaneously tightened against the pole, and said insert and receiver are drawn more tightly together.

* * * * *